United States Patent
Lovegren et al.

(10) Patent No.: US 10,345,126 B2
(45) Date of Patent: Jul. 9, 2019

(54) ILLUMINATED DIAL WITH INTEGRATED STATUS INDICATION

(71) Applicant: Rosemount Inc., Shakopee, MN (US)

(72) Inventors: Eric R. Lovegren, Monticello, MN (US); Scott D. Nelson, Plymouth, MN (US); Robert J. Karschnia, Chaska, MN (US)

(73) Assignee: Rosemount Inc., Shakopee, MN (US)

( * ) Notice: Subject to any disclaimer, the term of this patent is extended or adjusted under 35 U.S.C. 154(b) by 237 days.

(21) Appl. No.: 15/271,710

(22) Filed: Sep. 21, 2016

(65) Prior Publication Data
US 2018/0080804 A1   Mar. 22, 2018

(51) Int. Cl.
*G01D 13/20* (2006.01)
*G01D 13/26* (2006.01)

(52) U.S. Cl.
CPC ........... *G01D 13/20* (2013.01); *G01D 13/265* (2013.01)

(58) Field of Classification Search
CPC .............................. G01D 13/20; G01D 13/265
See application file for complete search history.

(56) References Cited

U.S. PATENT DOCUMENTS

| | | | |
|---|---|---|---|
| 2007/0090932 A1* | 4/2007 | Takato | B60K 35/00 340/438 |
| 2008/0190196 A1* | 8/2008 | Nunes | G01L 19/083 73/384 |
| 2009/0272313 A1* | 11/2009 | Ballard | G01D 7/005 116/28 R |
| 2013/0106574 A1* | 5/2013 | Kyberd | G08B 5/28 340/6.1 |
| 2015/0168644 A1* | 6/2015 | Meyers | G01D 11/28 362/511 |
| 2016/0146645 A1 | 5/2016 | Kielb et al. | |
| 2016/0231149 A1* | 8/2016 | Blackmer | B60K 37/02 |

OTHER PUBLICATIONS

"Rosemount Wireless Pressure Gauge" Emerson Process Management, dated 2016, pp. 2.
International Search Report and Written Opinion for International Patent Application No. PCT/US2017/048399. dated Nov. 23, 2017. 16 pages.

\* cited by examiner

*Primary Examiner* — Britt D Hanley
(74) *Attorney, Agent, or Firm* — Christopher R. Christenson; Kelly, Holt & Christenson PLLC (57) ABSTRACT

A process measurement display is disclosed that includes an indicator configured to change position to indicate a process variable. The display also includes an illumination source configured to provide light to the indicator. The display further includes a processor configured to control the illumination source to provide at least one additional output modality.

22 Claims, 9 Drawing Sheets

ILLUMINATED DIAL WITH INTEGRATED STATUS INDICATION

BACKGROUND

The present disclosure generally relates to process measurement devices. More specifically, but not by limitation, the present disclosure relates to display mechanisms for process measurement devices.

There are a wide variety of process measurement devices currently in use. Some devices include gauges, flowmeters, and measurement transmitters. These devices are often used in industrial settings for monitoring a temperature, pressure, humidity, turbidity, or pH. These devices can also use a display to show the measurement results. Displays are powered by an internal or external power source, or are non-powered and operate without electrical components.

SUMMARY

A process measurement display is disclosed that includes an indicator configured to change position to indicate a process variable. The display also includes an illumination source configured to provide light to the indicator. The display further includes a processor configured to control the illumination source to provide at least one additional output modality.

DETAILED DESCRIPTION OF ILLUSTRATIVE EMBODIMENTS

Figure 1:
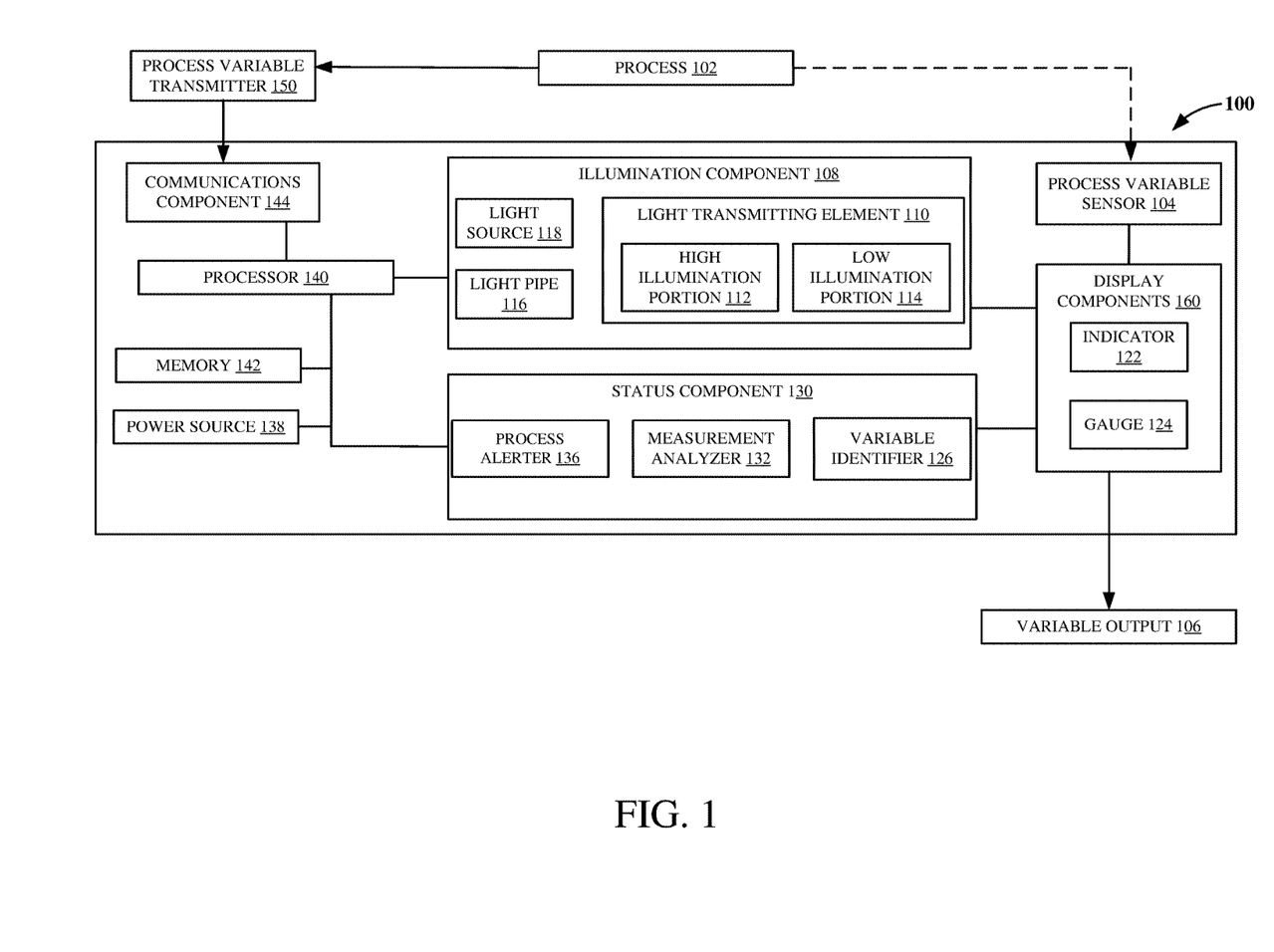
FIG. 1 is a block diagram illustrating a process measurement display in accordance with an embodiment of the present invention.

FIG. 1 is a block diagram illustrating a process measurement display in accordance with an embodiment of the present invention. Process measurement display 100 may sense a local process variable using process variable sensor 104 or may receive an indication of process sample 102 from remote process variable transmitter 150.

Receiving an indication of the process sample via process variable transmitter 150 may be beneficial in an embodiment where display 200 is part of a remote indicator. As such, the display may include communications component 144 that facilitates communication of the variable from process 102. Communications component 144 may be, for example, a wireless transceiver configured to transmit and receive signals within process environment 100. In one example, communications component 144 is configured to communicate in accordance with IEC 62591 (WirelessHART). In one embodiment, process measurement display 100 is configured to be used with a wireless pressure gauge (WPG) such that the display wirelessly receives process information and displays that information on the WPG.

Regardless of whether display 100 receives an indication or process 102 via sensor 104 or communications component 144, FIG. 1 illustratively shows that the indication may be ultimately provided as variable output 106.

Various components of the display, facilitated by processor 140, may be configured to generate a status and provide both the status indication and the process variable indication in enhanced viewing formats. These components include, for example, illumination component 108 and status component 130. Prior to discussing these components in detail, it will be generally noted that display 100 provides an indication of process 102 to display components 160.

Display components 160 illustratively include indicator 122 and gauge 124. Display components 160 may include a variety of other components as well, but will generally be described with respect to these particular features.

Indicator 122 may include a needle, pointer, or other mechanism that is moved to point to a process indication. In one embodiment, indicator 122 operates in association with gauge 124 to indicate a process measurement. Indicator 122 may be powered by power source 138. For instance, power source 138 is coupled to an electric motor (not shown) that is configured to rotate indicator 122 around the surface of gauge 124. This and similar embodiments will be discussed in further detail below with respect to status component 130. Gauge 124 may include dials that have a series of numbers that indicate, for instance, a scale of possible process indications. As such, indicator 122 may point to a scaled measurement by rotating to a number on gauge 124.

Figure 2:
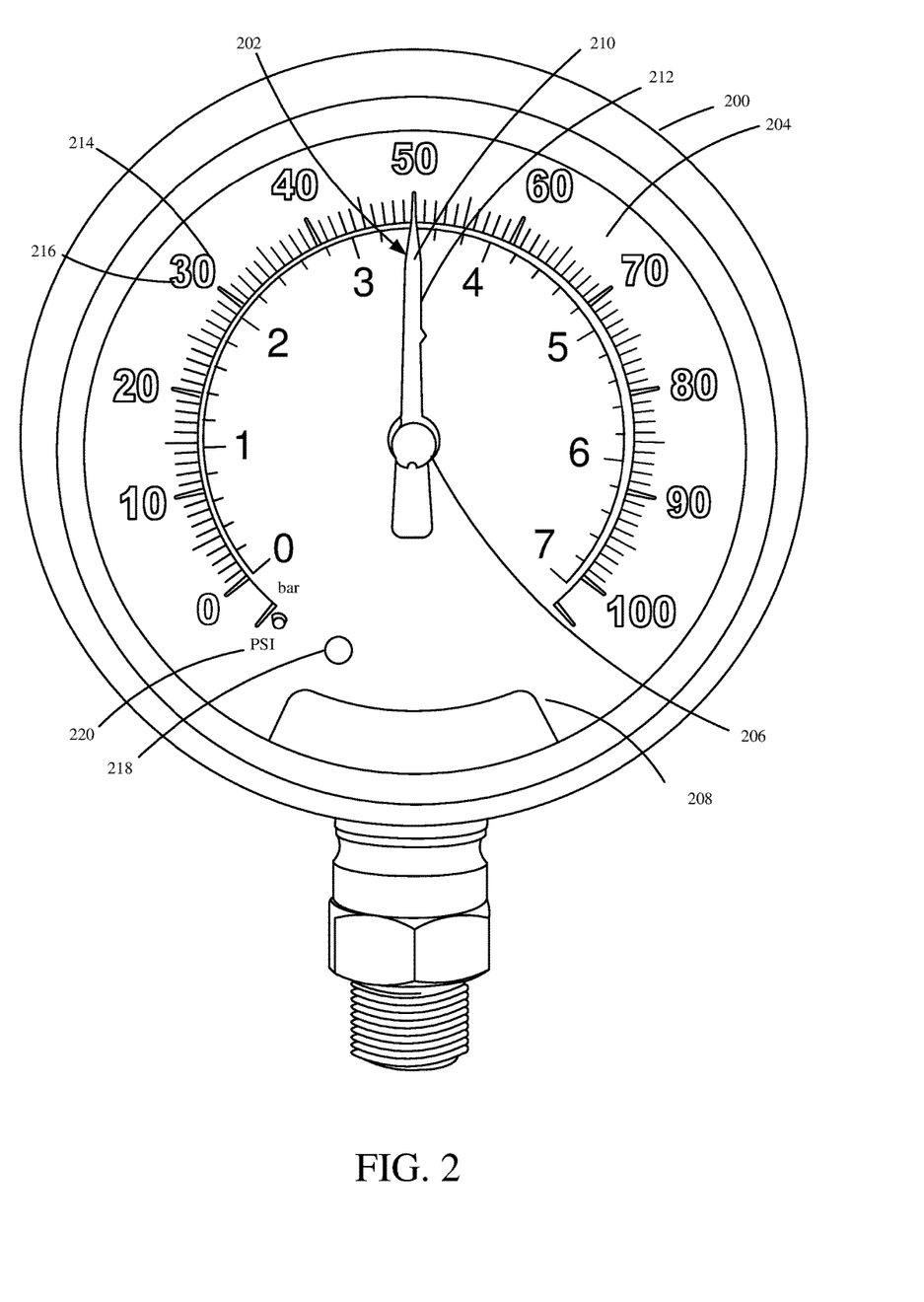
FIG. 2 shows a process measurement display in accordance with an embodiment of the present invention.

Turning briefly to FIG. 2, process measurement display 200 (i.e. the display for a WPG) may include display components 160. Gauge 200 illustratively includes a needle indicator 202, variable identifier 220, and gauge face 204 having measurement indicia thereon. Display component(s) 160 are configured to receive a measurement indication and display an indication of that measurement, as a process variable output on a process measurement display.

Mechanisms that provide a smart alerting gauge with illumination and status information will now be discussed in further detail. Turning to FIG. 1, process measurement display 100 includes processor 140, memory 142, power source 138, illumination component 108, and status component 130.

Processor 140 is a functional component of process measurement display 100 that is activated by and facilitates the functionality of other components within or coupled to the display. Processor 140 may be a microprocessor. In addition, processor 140 may be coupled to or may include memory 142. Memory 142 may be volatile, and/or non-volatile, computer storage media, or any other type of computer memory storage configuration.

In embodiments where the process sample is received digitally (i.e. via transmitter 150), the indication is provided by communications component 144. In one embodiment, process measurement display 100 also includes measurement circuitry that provides the indication of process 102 to processor 140. Processor 140 may provide instructions to various components of display 100 to generate an indication of the measured process variable. One such way is by generating a measurement indication on display 100. For instance, processor 140 may provide instructions to power source 138 to power an electric motor that rotates of indicator 122. Power source 138 may drive rotation of indicator 122 in a variety of ways, and, as such, processor 140 may be configured to instruct general movement of indicator 122.

Illumination component 108 is configured to provide illumination to process measurement display 100. Illuminating display 100 may increase the visibility of variable output 106, and thus increase the effectiveness of measurement reporting. Illumination component 108 may include light transmitting element 110, light pipe 116, and light source 118. Power source 138, processor 140, and memory 142 may be operably coupled to illumination component 108 to facilitate illumination to display 100. Processor 140 may utilize instructions stored in memory 142 to determine when light source 118 should be supplied a voltage (i.e. illuminated), what type of color, pattern of illumination, and a duration that illumination will be displayed. The particular type of illumination that is generated may be an indication of a particular device or process status or alert condition. In one embodiment, it may be advantageous to increase the visibility of variable output 106 while consuming a minimal amount of power.

In one embodiment, illumination component 108 is disposed on indicator 122 such that it illuminates a needle (i.e. needle 202 as shown in FIG. 2). Illumination component 108 may also or alternatively be disposed on and configured to illuminate gauge 124. For example, illumination component 108 is disposed on and configured to illuminate a dial on a gauge (i.e. gauge face 204 shown in FIG. 2). Regardless of the location at which illumination component 108 is disposed, it may be configured to transmit at least a portion of light provided by light source 118 such that light source 118 illuminates an indication of a measurement output. Illumination component 108 can further include, for example, pathways for providing light to a needle, materials or compositions that reflect or enhance light source 118 to a needle, or any combination of the above-mentioned features. In addition, illumination component 108 may be configured to illuminate display components without power source 138.

Light transmitting element 110 may be configured to transmit light to display components 160. In one embodiment, light transmitting element 110 includes high illumination portion 112 and low illumination portion 114. The combination of a high illumination portion and a low illumination portion allows the display to disperse light from source 118 to particular portions of display 100. For example, high illumination portion 112 and low illumination component 114 receive different intensities of light from source 118. High illumination portion 112 may be configured to receive a high intensity of light from source 118. On the other hand, low illumination portion 114 may be configured to receive a lesser intensity of light from source 118. In one embodiment, high illumination portion 112 includes an optically translucent material while low illumination component 114 includes a non-optically translucent material.

Illumination component 108 may further include light pipe 116. Light pipe 116 may be configured to facilitate the transmission of powered or non-powered light source 118 to the portions of light transmitting element 110. In addition, light pipe 116 may be configured to generate a high luminance of light at high illumination portion where light source 118 is an ambient light source (e.g., light pipe 116 reflects the ambient light source to generate an intensity of luminance that comparable to that provided by a powered light source). In one embodiment, light pipe 116 increases the transmission of light to high illumination component 112 and low illumination component 114. Illumination component 108 will be further discussed with respect to FIG. 2, FIG. 3A, and FIG. 3B.

Referring back to FIG. 1, process measurement display 100 may also include status component 130. In one embodiment, status component 130 provides an indication of the status of process measurement display 100. For instance, status component 130 generates status and diagnostic indications that are indicative of how the measured sample compares to defined parameters, or whether the device and display are properly functioning. The various status and diagnostic indications may include process alerts. These process alerts can be provided to illumination component 108 along with other components of process measurement display 100.

There are several challenges associated with determining the status of measurement devices. The first is the lack of an indication as to whether the gauge is working properly. Having a way to indicate whether the device has detected an issue or a user alert condition may assist in measurement reporting operations. As such, status component 130 may be configured to provide an indication as to whether the gauge is working properly. This allows process measurement display 100 to indicate on-scale failures and/or process condition alerts. Status component 130 is operably coupled to processor 140 such that processor 140 facilitates and provides instructions to component 130.

Status component 130 illustratively includes measurement analyzer 132 and process alerter 136. Measurement analyzer 132 may be configured to receive the process indication, as provided by process variable transmitter 150 via communications component 144. In one embodiment, measurement analyzer 132 evaluates the measurement against measurement parameters stored in memory 142. For example, an operator sets parameters for process 102. The parameters define, in one embodiment, acceptable and non-acceptable ranges of variable output 5106. As such, measurement analyzer 132 may determine whether the measurement is within or outside of the identified parameters.

Further, process alerter 136 may be configured to receive the analyzed measurement from measurement analyzer 132 and provide one or more alert indications to process measurement display 100. Alert indications may generally show whether the identified measurement is within an acceptable range, a non-acceptable range, or an alert range. In one embodiment, process alerter 136 instructs illumination component 108 and, for example, light source 118, to generate an illuminated indication based on the analyzed measurement. These alerts may further indicate whether there is a potentially hazardous, malfunctioning device or a properly functioning process 102.

Thus, FIG. 1 illustratively shows that process measurement display 100 receives a process indication and provides an indication of the measurement with display components 160, increases the visibility of the output with illumination component 108, analyzes the variable output with status component 130 to determine a status, and provides an indication of the determined status to the display. As such, display 100 may generate illuminated indications that generally identify the measurement and status alerts with increased visibility.

FIG. 2 shows a process measurement display in accordance with an embodiment of the present invention. Process measurement display 200 may include any or all of the elements discussed with respect to process measurement display 100. Process measurement display 200 illustratively includes gauge face 204 and needle 202. Process measurement display 200 receives light from a light source (e.g. light source 118, shown in FIG. 1) and directs the light to needle 202 and dial 204. For example, illumination component 108 is disposed on needle 202 such that needle 202 includes a high illumination portion 210 and a low illumination portion 212. Illumination component 108 may also be operably coupled to an illuminator of gauge face 204 such that the dial includes high illumination portion 216 and low illumination portion 214. In one embodiment, high illumination portions 210 and 216 include an optically translucent material that allows a light to easily pass through. Low illumination portions 214 and 212 may include a non-translucent material that does not permit light to pass. Therefore, needle 202 and gauge face 204 can provide varying degrees of luminance to process measurement display 200 to increase the visibility of display 200. Light source 118 may be disposed on or configured to be included with process measurement display 200. For example, light source 118 may be disposed at or near base 206 of needle 202 and/or base 208 of dial 204.

Process measurement display 200 may also include status indicator 218. Status indicator 218 may be configured to convey a process alert or diagnostic indication from process alerter 136. In one embodiment, status indicator 218 includes a light indicator that indicates the status as determined by status component 130 analyzing the process indication. For example, status indicator 218 changes colors in accordance with the determined status. For example, green may indicate a good status; yellow may indicate a warning status; and red may indicate a bad or non-functional status. Status indicator 218 can include a variety of other indicating mechanisms, and is not limited to a color changing light. Further, status indicator 218 may be disposed on needle 202 and dial 204, or any combination of the above mentioned implementations.

As shown in FIG. 2, process measurement display 200 may further include variable identifier 220. In the present example, variable identifier 220 provides an indication of the process measurement being a pressure that is reported to display 200 in pounds per square inch (PSI). Variable identifier 220 can identify a variety of other variables as well, and is not limited to identifying PSI.

Figure 3A:
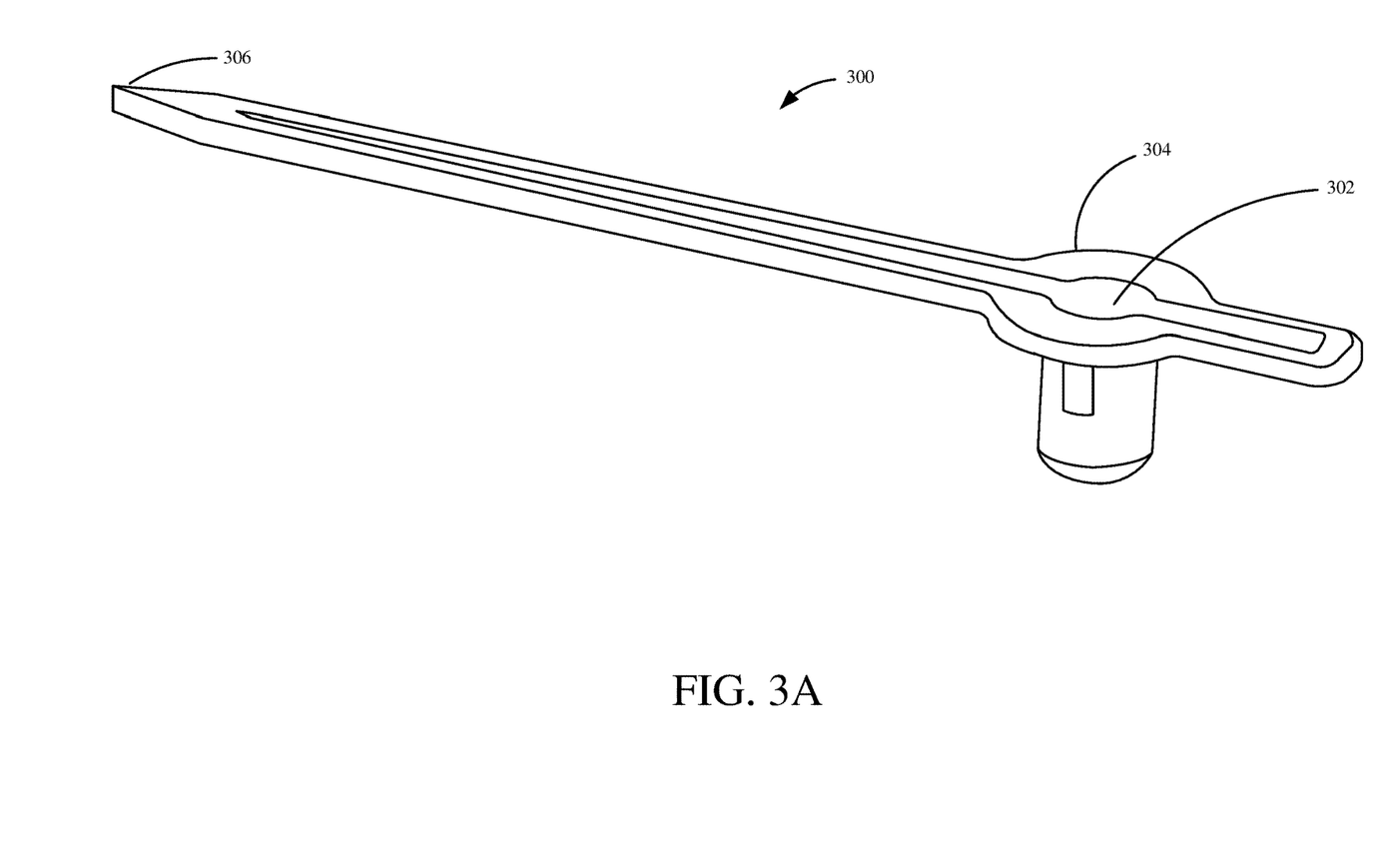
FIG. 3A is a perspective view illustrating a process indication component in accordance with an embodiment of the present invention.

FIG. 3A is a perspective view illustrating a process indication component in accordance with an embodiment of the present invention. Process indication component 300 may be an indicator positioned on a display (i.e. indicator 122). In one embodiment, component 300 includes a needle for a process measurement display (i.e. needle 202 of process measurement display 200). Process indication component 300 may include a tip or pointer 306 positioned at a distal end of the component. Tip 306 may be configured to point directly to the process indication, with respect to a variable identifier 220, on gauge face 204. Component 300 may also include high illumination portion 302 and low illumination portion 304. High illumination portion 302 may include any or all of the features discussed with respect to high illumination component 112. Low illumination component 304 may include any or all of the features discussed with respect to low illumination component 114.

Figure 3B:
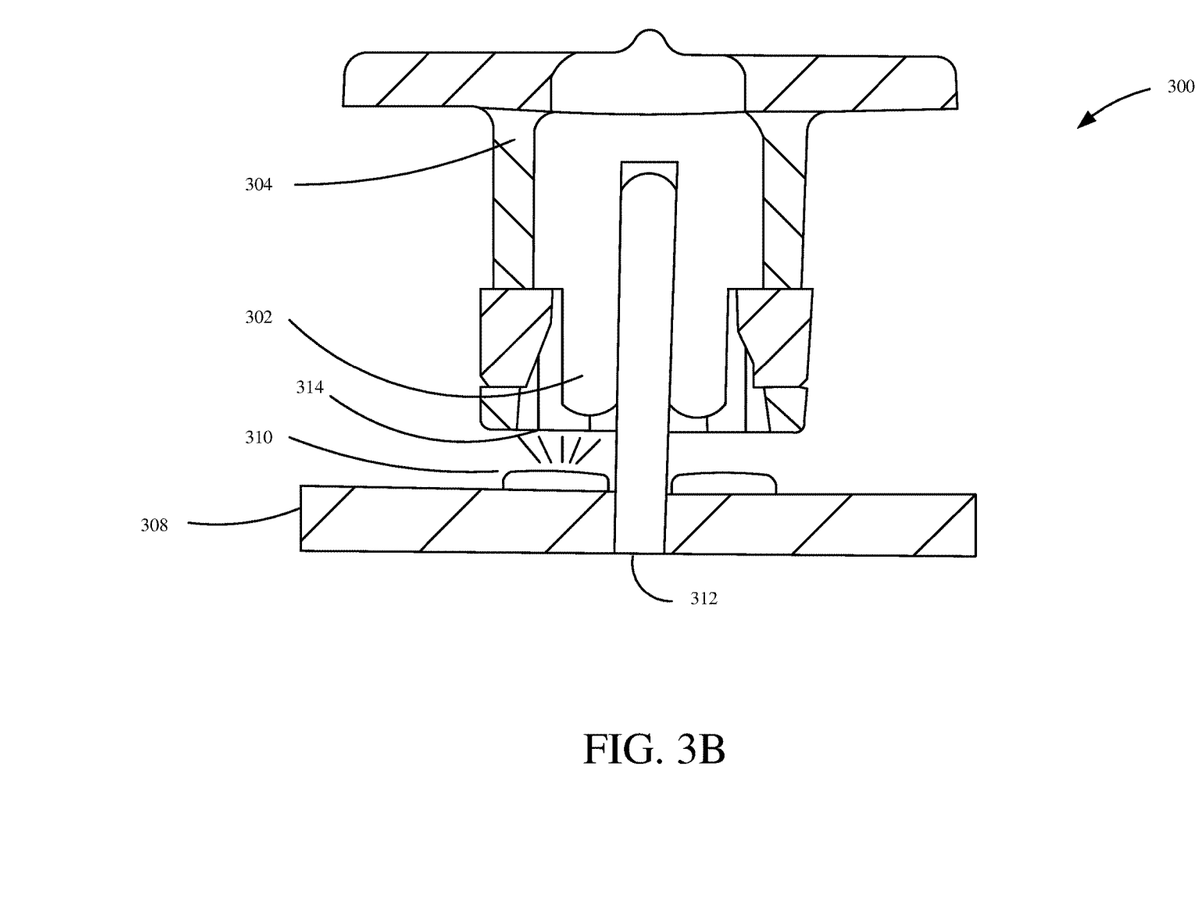
FIG. 3B is a rear perspective view of a process indicating component in accordance with an embodiment of the present invention.

FIG. 3B is a rear elevation view of a process indicating component in accordance with an embodiment of the present invention. Component 300 may be supported by measurement axle 312 on base 308. In one embodiment, measurement axle 312 is a functional component of measurement mechanism 104. In another embodiment, measurement axle 312 is configured to be moved by a motor (not shown) that is powered by power source 138.

In one embodiment, base 308 includes base 206 of needle 202. Base 308 may include light source 310. Light source 310 is configured to transmit light to one or more illumination portions of component 300. For example, but not by limitation, light source 310 may directly transmit light to the various portions of component 300. Alternatively, light source transmits light to light pipe 314. For example, light pipe 314 includes an opening configured to receive an LED or a reflection of an ambient light source. Light pipe 314 then transmits light from the source to high illumination component 302 and low illumination component 304.

As such, light pipe 314 is thus configured to distribute light provided by light source 310 to the various portions (i.e. high illumination and low illumination portions 302 and 304, respectively) of component 300. In one example, light pipe 314 is configured to distribute light along at least a portion of the length of needle 300 to tip 306. Light pipe 314 may also include reflective portions along needle 300. Further, light pipe 314 can include one or more light tubes configured to transport and distribute the light exclusively to high illumination component 302. Thus, component 300 may be illuminated at portions that are optically translucent or conducive to distributing or enhancing luminance as provided by light source 310 to increase the visibility of needle 300 on process measurement display 100.

Figure 4:
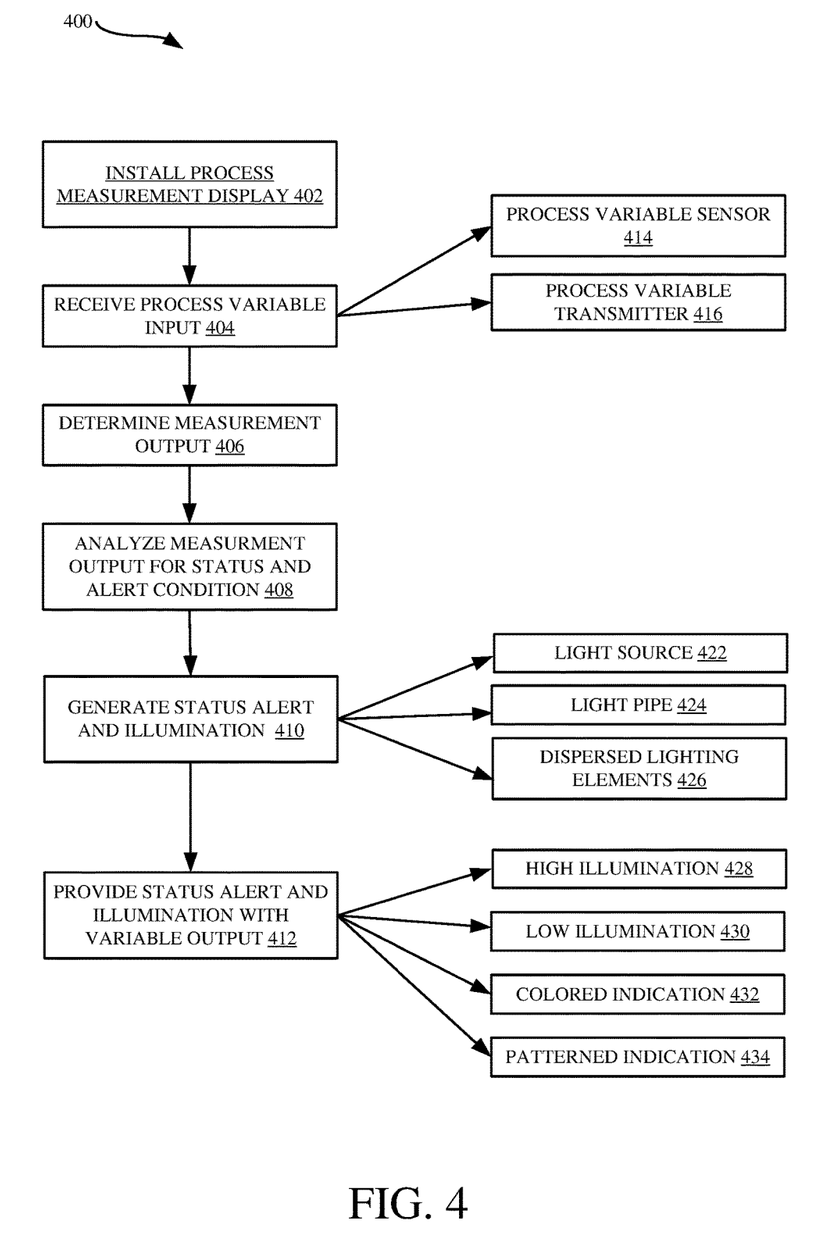
FIG. 4 shows a flow diagram of a method of illuminating a measurement display in accordance with an embodiment of the present invention.

FIG. 4 shows a flow diagram of a method of providing illumination and status indications to a measurement display, in accordance with an embodiment of the present invention. At block 402 of method 400, a process measurement display may be installed and configured to display a process indication. For example, a wireless pressure gauge with a measurement display is installed and configured to output a pressure indication. Installing a process measurement mechanism may also include configuring an installed process measurement display to support providing status alerts and illumination.

At block 404, method 400 illustratively includes receiving a process variable input. The process variable input may be received by, for example, process variable sensor 414 or process variable transmitter 416. Process variable inputs can include indications of a process sample such as pressure, temperature, and flow rate, among others.

A process measurement display may be configured to receive a process variable input and determine a measurement output. This is generally shown at block 406. For instance, the display receives an indication of process 102. The display determines a measurement output with status component 130. Process measurement display 100 may utilize, for example, measurement analyzer 132 to determine a measurement of process 102.

The measurement display may be configured to analyze the measurement input for measurement status and alert conditions, as related to process 102. This is generally shown at block 408. For instance, a process alerter 136 compares the determined measurement to measurement parameters stored in memory 142. Determining status and alert conditions will be discussed in further detail below.

Prior to discussing how a display determines such conditions, block 410 shows that a process measurement display may be configured to provide illumination to the display. Providing illumination to the display may include utilizing light source 402, light pipe 424, and dispersed lighting elements 426. Providing illumination may utilize any or all of illumination components 108 discussed herein, as well as a variety of other lighting mechanisms.

At block 412, a process measurement display is configured to provide the status alert and illumination with a determined variable output. Generating the illuminated measurement output can include providing the illuminated output to a high illumination portion 428 and low illumination portion 430. As such, there can be varying intensities of illumination that are transmitted to process measurement display 100. The varying luminance, for instance, distinguishes between areas of importance on a process measurement display. In addition, the status alerts and conditions may be provided with the illumination of the variable output. Further, these various conditions and measurements may be provided with colored indication 432 and/or patterned indication 434 to more clearly distinguish the output.

Figure 5:
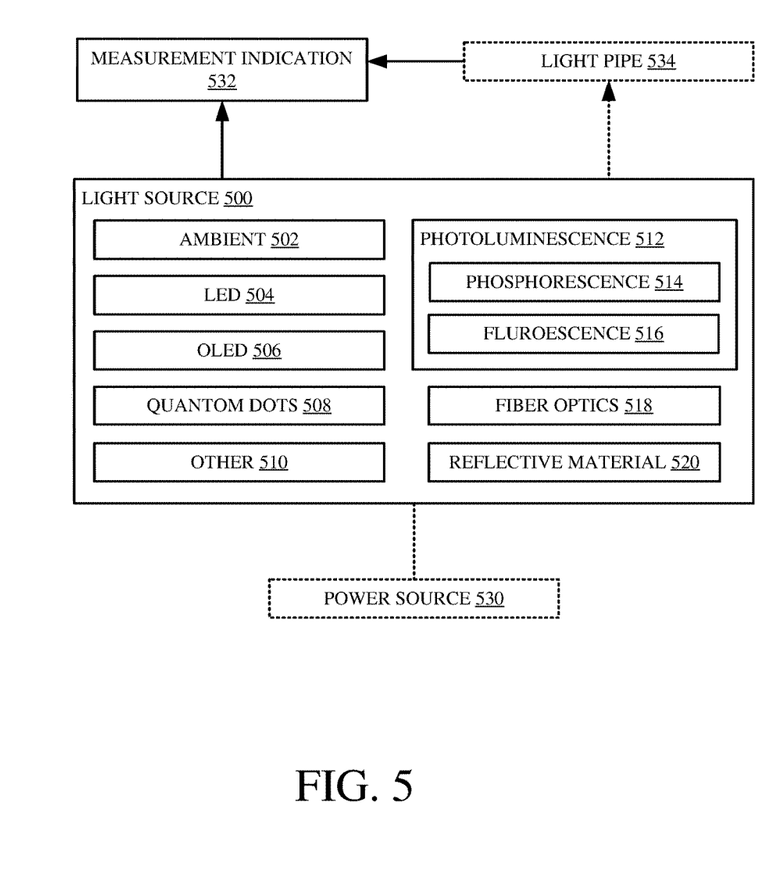
FIG. 5 shows a block diagram illustrating an illumination configuration in accordance with an embodiment of the present invention.

FIG. 5 shows a block diagram illustrating an illumination configuration in accordance with at least one embodiment of the present invention. Light source 500 may be configured to, in one embodiment, receive power from power source 530. Operating with power source 530 can further increase the accuracy and visibility of illumination provided to a process measurement display, and may also be configured to operate with intrinsic safety.

Light source 500 includes a variety of lighting elements that may provide illumination directly to measurement indication 532. Light source 500 also includes a variety of lighting elements that may provide illumination to light pipe 534. Light pipe 534 may be configured to subsequently transfer the illumination to measurement indicator 532. Light pipe 534 may also be configured to enhance the illumination provided to measurement indicator 532. For example, the light pipe reflects or increases the luminance provided by light source 500 to improve the visibility of measurement indicator 532.

FIG. 5 illustratively shows that light source 500 may include the following lighting elements: ambient 502, LED 504, OLED 506, quantum dots 508, photoluminescence 512, fiber optic 518, reflective material 520, and other lighting elements 510. Photoluminescence elements 512 may include, for example, phosphorescence material 514 and fluorescence material 516. Photoluminescence material 512 may be disposed on, for example, a high illumination component (i.e. high illumination portion 112). A high illumination component may also be constructed of a material that includes at least a portion of photoluminescence material 512. Similarly, photoluminescence material 512 may be disposed on a low illumination component. A low illumination component (i.e. low illumination portion 114) may also be constructed of a material that includes at least a portion of photoluminescent material 512. Alternatively, a low illumination component is not optically translucent and thus does not include photoluminescent material 512.

Just as photoluminescent material 512 may be disposed on a needle and gauge of the display, reflective material 520 may also be disposed on those elements to reflect an ambient or powered light source. For example, an operator may utilize a flashlight to view a process measurement display by shining the light on reflective material 520.

Lighting element(s) (i.e. elements 502-520) may be disposed on a base of a needle or a gauge and projected to at least a portion of the high illumination portion and low illumination portion. In one embodiment, fiber optic 518 is disposed along needle 300. For instance, fiber optics 518 are specifically disposed at or near high illumination portion 302, and along the length of needle 300 towards tip 306. As such, fiber optics 518 carry light transmitting elements along at least a portion of high illumination portion 302 and low illumination portion 304. In addition or alternatively, fiber optics 518 are disposed on a portion of gauge 124. Fiber optics 518 may be disposed at or near portions of high illumination and low illumination portions 216 and 214, respectively.

Figure 6:
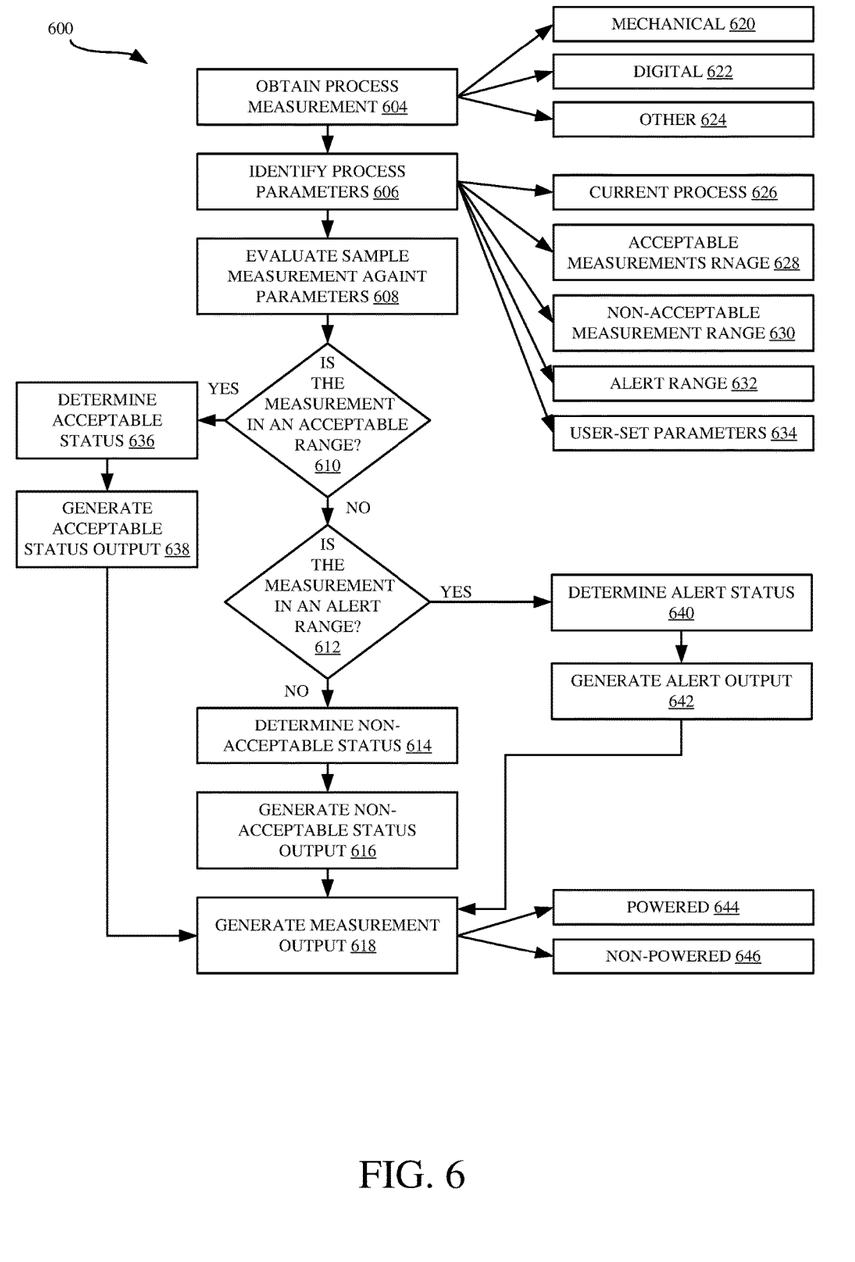
FIG. 6 is a flow diagram of a method of generating a status indication in accordance with an embodiment of the present invention.

FIG. 6 is a flow diagram of a method of generating a status indication in accordance with an embodiment of the present invention. Method 600 begins at block 604, where a process measurement is obtained. For example, process measurement display 100 receives process measurement 102 from a process variable sensor or other device.

At block 606, one or more components of a process measurement display are configured to identify process parameters. One advantage of the process measurement display described herein is its ability to compare sample measurements to previously-defined measurement criteria. In order to do so, one or more components of the display are configured to identify parameters for the process. Identifying process parameters may include identifying current processes 626, acceptable sample measurement ranges 628, non-acceptable measurement ranges 630, alert ranges 632, and user-set parameters 634. Current processes 626 may include identifiers of the current process flow. Acceptable measurement ranges 628 can include ranges of measurements that indicate process 102 is functioning properly (i.e. PSI less than 55, but greater than 35 is a "good" range for the pressure of the process). Non-acceptable ranges 630 can include ranges of measurements that indicate process 102 is not functioning properly, and that there may be an error in a process environment (i.e. PSI greater than 25 but less than 35, and PSI greater than 55, but less than 65). Alerts 632 can include an indication of a process alert, such as a device fault or process degradation either locally or at any device or facility in the process.

For example, status component 130 may initially receive a measurement indication from processor 140, as provided by process variable transmitter 150. Measurement analyzer 132 identifies the initial measurement indication. This initial indication can be stored in memory 142 and used for immediate or later retrieval.

The various process parameters that are identified (i.e. parameters 628-634) may be configured by, for example, an operator of a process management system. In one embodiment, user set parameters 634 are parameters relating to process 102 and variable output 106 that are defined by, for example, an operator. As such, process measurement display 100 includes components that identify ranges and parameters that are used in evaluating the sample measurement.

Evaluating the sample measurement against parameters is generally indicated by block 608 in FIG. 6. In evaluating the sample measurement, process measurement display 100 may utilize measurement analyzer 132 and process alerter 136 to determine whether or not the sample measurement is within or outside of the identified ranges. In addition, user set parameter 634 can identify specific sample measurement outputs that are flagged to produce alert or other status indications. For instance, where process measurement display 100 outputs a sample measurement indicative of a pressure, an operator may set user parameters such that process alerter 136 generates an alert indication when the sample measurement is greater than 70 PSI. As such, various ranges and parameters can be set to provide a dynamic process measurement display that utilizes process alerter 136 and measurement analyzer 132 to evaluate the sample measurement against those ranges and parameters.

At block 610, a process measurement display determines whether the measurement indication is within an acceptable range. In one embodiment, status component 130 determines whether the sample measurement is within any of the ranges. Status component 130 may generate indications of the evaluated sample measurement and the determined status. For example, process alerter 136 generates status indications based on the determinations as to whether the sample measurement is within one of the specified ranges.

If it is determined that the sample measurement (e.g., a pressure or temperature measurement) is within an acceptable range, status component 130 and thus display 100 determine that there is an acceptable status. This is generally indicated by block 636. Process measurement display 100 may utilize process alerter 136 to generate an acceptable output. This is generally indicated by block 638. However, where status component 130 determines that the measurement indication is not within an acceptable range, it continues to determine whether or not the measurement indication is within an alert range. This is generally indicated by block 612. Where the measurement is determined to be within alert range, status component 130 may determine an alert status. Determining an alert status is generally shown at block 640. Thus, status component 130 generates an alert output as indicated by block 642. Where the sample measurement is not within an alert range, status component 130 determines that the measurement is not in an acceptable range, but is also not within an alert range, and thus is within a non-acceptable status range. This is generally indicated by block 614. As such, status component 130 will generate a non-acceptable status output, which is indicated by block 616. The various alert outputs, as determined by status component 130, may utilize any of the features described with respect to FIG. 1. The process measurement display may utilize illumination mechanisms (e.g. illumination component 108, illumination source 500, etc.) to generate at least a portion of the status alert indication on the display.

While acceptable, non-acceptable, and alert ranges are primarily discussed herein, a variety of other ranges and parameters may be utilized. Further, regardless of the determined status, process measurement display 100 may at least generate a measurement output. Generating a measurement output is generally indicated by block 618. The process measurement display may use powered 644 and non-powered 646 mechanisms, along with any of the elements as discussed with respect to FIG. 1 in generating a measurement output.

Figure 7:
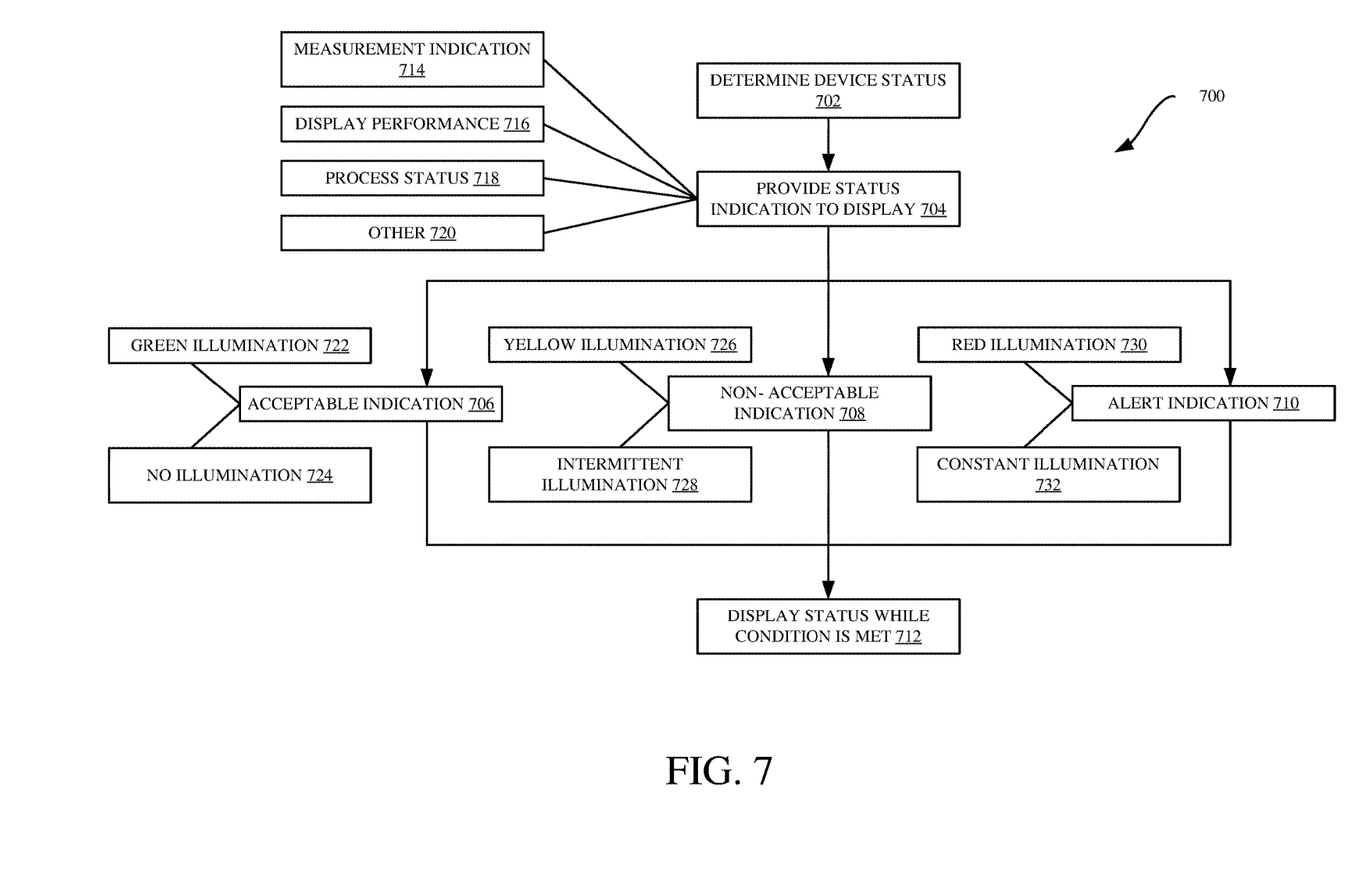
FIG. 7 is a flow diagram of a method of providing a status indication to a measurement display in accordance with an embodiment of the present invention.

FIG. 7 is a flow diagram of a method of providing a status indication to a measurement display in accordance with an embodiment of the present invention. Method 700 may include determining a device status. This is generally indicated by block 702. Determining device status can include any of the methods discussed with respect to method 600. Providing a status indication to the process measurement display is generally indicated by block 704 in FIG. 7. Providing the status indication can include providing a measurement indication 714, a display performance indication 716, a process status indication 718, and a variety of other indications 720. Measurement indication 714 may be an indication of the determined measurement for an indication of the variable of process 102. Display performance indication 716 may include an indication of whether the process measurement display is functioning properly. Lastly, process status indication 718 may provide an indication of whether process 102 is functioning properly. These indications, as well as others, may be determined by status component 130 and transmitted to the display via illumination component 108, for example.

Providing a status indication may include providing an acceptable indication, which is generally shown at block 706. Providing an acceptable indication can utilize a variety of mechanisms that determine an acceptable status (i.e. and acceptable measurement indication 714 and/or display performance and/or process status) to generate the indication. These mechanisms may be customized based on preferences set by, for example, an operator. In one embodiment, status indicator (i.e. status indicator 218 as shown in FIG. 2) receives the acceptable status indication and generates a green colored illumination. This is generally indicated by block 722. The green illumination is provided to, for example, at least one of status indicator 218 and illumination component 108. In one embodiment, providing the acceptable indication does not provide any illumination to the display. Providing no illumination is generally indicated by block 724.

The process display may also determine a non-acceptable status and provide the corresponding indication. Providing a non-acceptable indication is generally indicated by block 708. While an acceptable indication may include a green illumination, the display may generate a yellow colored illumination 726 in response to determining a non-acceptable status. As such, illumination component 108 may be configured to receive the determined status and generate a non-acceptable status indication. The process measurement display may also provide an intermittent illumination 728. Intermittent illumination 728 can include, for example, flashing and/or various timing of on and off illuminations provided that are provide to the display components of the process measurement display.

Lastly, the process measurement display may determine an alert status and provide the corresponding indication. Providing an alert indication is generally indicated by block 710. This can include generating a red colored indication 730, and may also include providing constant illumination 732. As such, illumination component 108 may be configured to receive the determined status and generate an alert status indication.

A variety of colors and illuminations may be used, and are not limited green, yellow, and red colors, and the timing of illumination discussed above. These are merely example indications that are optimized to provide increased visibility and diagnostic understanding of a process measurement display. While the various colors of illumination can be provided by light source element 500 and may vary in the length and duration of their illumination, they can be provided to any and all of the illumination components and status indicators discussed herein. In one embodiment, an operator sets up "good, bad, and warning" alerts such that the process alert state changes the needle color based on the measured process value.

As discussed above, process measurement display 100 may include a status indicator (i.e., status indicator 218 as shown in FIG. 2). In one example, measurement analyzer 132 determines that a pressure for process 102 is within an alert range. Thus, process alerter 136 instructs illumination component 108 to provide light source 118 to indicator 218 with a red-colored illumination that is constantly illuminated. The operator may view display 200 and quickly discern that the process is in a "bad" region, thereby indicating that process 102 is malfunctioning or producing an unsafe pressure. In one embodiment, the illumination may be provided by fiber optic 518 or LED 504 to high illumination component 302 disposed on needle 300. Regardless of the type of alert indication and its associated color and illumination duration, process measurement display 200 is configured to display the status while the determined condition (i.e. acceptable, non-acceptable, alert, status) is met. This is generally indicated by block 712.

Figure 8:
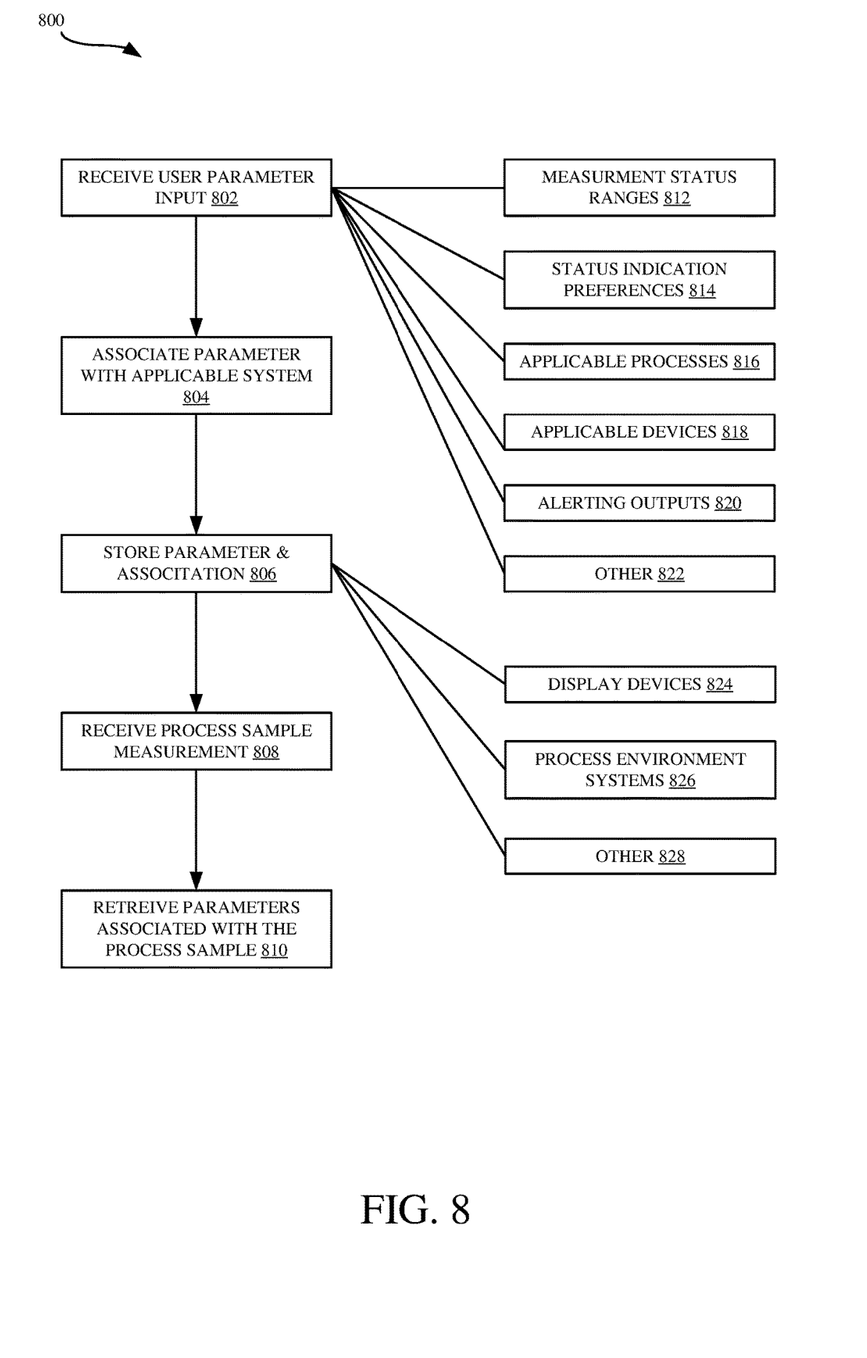
FIG. 8 is a flow diagram of a method of processing a parameter input for a measurement display in accordance with an embodiment of the present invention.

FIG. 8 is a flow diagram of a method of processing a parameter input for a measurement display in accordance with an embodiment of the present invention. At block 802, method 800 shows that a measurement display receives a parameter input from a user. As briefly discussed above, a user (i.e. an operator) may provide ranges and/or parameters to process measurement display 100 in order to customize alert and diagnostic indications. The user parameter input can include a variety of identifiers relating to the measurement, process status, and display performance indications. For example, FIG. 8 shows that receiving a user input can include receiving measurement status ranges 812, status indication preferences 814, applicable processes 816, applicable devices 818, alerting outputs 820, and other parameter inputs 822.

Measurement status ranges 812 can include the various ranges for the type of process measurement and whether or not those ranges are acceptable, non-acceptable, and alert ranges. The process measurement display may also process a variety of other parameter inputs and ranges. As such, process measurement display 100 is not limited to only acceptable, non-acceptable, and alert ranges. For example, an operator may indicate that a certain pressure measurement above 120 PSI is within a hazard range. In another example, the process measurement display processes a parameter input that is indicative of a "power off" measurement range. When the sample measurement is determined to be within this range, the display automatically turns off or reduces at least a portion of power consumption of the device. This may be useful in hazardous process situations or conditions in which the availability of the battery power is reduced.

An operator, for example, may also provide parameters for alerting outputs 820. Alerting outputs 820 can be feedback outputs that indicate when the range is in the hazard or alert range. In one embodiment, alerting outputs 820 include haptic, audio, and visual output mechanisms. Alerting outputs may also be configured to notify a process management system, controller, and other output locations.

Status indication preferences 814 can include various preferences that allow a user to set a color, portion of the display, and duration of the indication for the various status outputs. For example, an operator can customize the color and duration of illumination provided to needle 300 such that an alert indication results in a flashing, and red colored illumination transmitted to needle 300.

Process measurement display 100 may also be configured to associate measurement status ranges 812 and status indication preferences 814 with applicable processes 816 and applicable devices 818. Thus, an operator can configure each process variable sensor 304 in a process environment with the various processes 102 for fully customizable status and measurement indications.

At block 804, process measurement display 100 may be configured to associate parameters with the applicable systems. In one embodiment, status component 130 receives a unique identifier that is associated with applicable devices 818 and/or applicable processes 816 and stores the unique identifier for later retrieval and use. Storing parameters and their associations is generally indicated by block 806. This can include any type of memory storage configuration which may be disposed at display devices 824, process environment systems 826 and other locations 828. As such, the process measurement display and its associated components are configured to provide a variety of mechanisms for storing and associating unique devices with preferences for providing status alerts in a process environment.

At block 808, process measurement display 100 illustratively obtains a process measurement. Once a process measurement is obtained the parameters associated with the process are identified and retrieved to be used with status component 130 so that they are ultimately output, as indicated by block 810.

Although the present invention has been described with reference to preferred embodiments, those skilled in the art will recognize that changes may be made in form and detail without departing from the spirit and scope of the invention.

What is claimed is:

1. A process measurement display comprising:
an indicator configured to change position to indicate a process variable;
an illumination source configured to provide light to the indicator;
a first portion configured to receive light from the illumination source and a second portion configured to received light from the illumination source wherein the first portion has a different luminosity than the second portion; and
a processor configured to control the illumination source to provide at least one additional output modality.

2. The display of claim 1, wherein the indicator is a needle.

3. The display of claim 2, wherein the needle includes a light pipe coupled to the illumination source.

4. The display of claim 1, wherein the illumination source is configured to provide different illumination colors to the indicator.

5. The display of claim 1, wherein the additional output modality comprises a device status.

6. The display of claim 1, wherein the additional output modality comprises a process variable status.

7. The display of claim 1, wherein the additional output modality comprises a process alert.

8. The display of claim 1, further comprising a gauge face, the indicator being configured to change position relative to the gauge face.

9. The display of claim 8, wherein the gauge face includes measurement indicia thereon.

10. The display of claim 8, wherein the gauge face includes a light pipe coupled to the illumination source.

11. The display of claim 8, wherein the gauge face comprises a reflective material.

12. A process measurement display, comprising:
a measurement mechanism configured to receive a sensor signal and provide an indication of a process measurement;
a process variable output configured to generate a signal to display the indication of the process variable measurement;
an indicator configured to display the process variable measurement; wherein the the indicator has a first portion configured to display light and a second portion configured to display light wherein the first portion has a different luminosity than the second portion;
a status component configured to determine a process status, based on the indication of the process measurement; and a status indicator that provides an indication of the determined process status to the display.

13. The process measurement display of claim 12, wherein the status component is further configured to identify a process parameter and evaluate the indication of the process measurement with the process parameter.

14. The process measurement display of claim 13, wherein the process parameter comprises a range of acceptable process measurements.

15. The process measurement display of claim 13, wherein the status indicator is configured to provide an illumination from a light source, the illumination being indicative of the process status.

16. The process measurement display of claim 15, wherein the illumination has a color that is indicative of the process status.

17. The process measurement display of claim 15, further comprising:
   a light transmitting element that directs the illumination from the light source to the status indicator; and
   wherein the light source comprises an ambient light source.

18. The process measurement display of claim 17, wherein the status indicator is disposed on a portion of a measurement identifier, the measurement identifier being configured to identify the indication of the process measurement.

19. The process measurement display of claim 17, wherein the light transmitting element comprises a light pipe.

20. The process measurement display of claim 12, wherein the measurement mechanism comprises a process variable sensor.

21. The display of claim 8. wherein the gauge face comprises a first portion configured to receive light from the illumination source and a second portion configured to receive light from the illumination source, wherein the first portion has a different luminosity than the second portion.

22. A process measurement display comprising:
   an indicator configured to change position to indicate a process variable;
   an illumination source configured to provide light to the indicator;
   a gauge comprising a first portion configured to receive light from the illumination source and a second portion configured to receive light from the illumination source, wherein the first portion has a different luminosity than the second portion; and
   a processor configured to control the illumination source to provide at least one additional output modality.

* * * * *

UNITED STATES PATENT AND TRADEMARK OFFICE
CERTIFICATE OF CORRECTION

Page 1 of 1

PATENT NO. : 10,345,126 B2
APPLICATION NO. : 15/271710
DATED : July 9, 2019
INVENTOR(S) : Eric R. Lovegren, Scott D. Nelson and Robert J. Karschina It is certified that error appears in the above-identified patent and that said Letters Patent is hereby corrected as shown below:

In the Drawings

Figure 5: "FLUROESCENCE 516" should read "FLUORESCENCE 516"

Figure 8: "RETREIVE" should read "RETRIEVE"

In the Specification

Column 4, Line 46: reference number "5106" should read "106"

In the Claims

Claim 1, Line 26: "received" should read "receive"

Claim 12, Line 61: delete second "the"

Claim 21, Line 7: "." after "8" should read ","

Signed and Sealed this
Twenty-eighth Day of January, 2020

Andrei Iancu
*Director of the United States Patent and Trademark Office*